United States Patent
Brendel

(10) Patent No.: US 9,646,368 B2
(45) Date of Patent: *May 9, 2017

(54) AUTOMATIC COLOR CORRECTION

(71) Applicant: Google Inc., Mountain View, CA (US)

(72) Inventor: William Brendel, San Francisco, CA (US)

(73) Assignee: Google Inc., Mountain View, CA (US)

( * ) Notice: Subject to any disclaimer, the term of this patent is extended or adjusted under 35 U.S.C. 154(b) by 216 days.

This patent is subject to a terminal disclaimer.

(21) Appl. No.: 14/459,058

(22) Filed: Aug. 13, 2014

(65) Prior Publication Data

US 2014/0348427 A1 Nov. 27, 2014

Related U.S. Application Data

(63) Continuation of application No. 13/656,550, filed on Oct. 19, 2012, now Pat. No. 8,811,740.

(51) Int. Cl.
*G06K 9/00* (2006.01)
*G06T 5/40* (2006.01)
*G06T 5/00* (2006.01)
*G06T 11/00* (2006.01)
(Continued)

(52) U.S. Cl.
CPC .......... *G06T 5/40* (2013.01); *G06T 5/001* (2013.01); *G06T 5/007* (2013.01); *G06T 7/208* (2013.01); *G06T 7/408* (2013.01); *G06T 11/001* (2013.01); *G06T 2207/10016* (2013.01); *G06T 2207/10024* (2013.01); *G06T 2207/20048* (2013.01); *G06T 2207/20076* (2013.01); *G06T 2207/20172* (2013.01)

(58) Field of Classification Search
CPC ......... G06T 5/007; G06T 7/208; G06T 7/408;
G06T 2207/10016; G06T 2207/20076;
G06T 5/001; G06T 5/40; G06T 11/001;
G06T 2207/10024; G06T 2207/20048;
G06T 2207/20172
USPC ........................................................ 382/167
See application file for complete search history.

(56) References Cited

U.S. PATENT DOCUMENTS

| | | |
|---|---|---|
| 5,874,988 A | 2/1999 | Gu |
| 6,704,445 B1 | 3/2004 | Gonsalves |
| 7,508,993 B2 | 3/2009 | Yuan et al. |

(Continued)

OTHER PUBLICATIONS

Shan et al., "Image-Based Surface Detail Transfer," 6 pages, Dec. 8, 2001, <http://research.microsoft.com/en-us/um/people/zliu/aging.pdf>.

(Continued)

*Primary Examiner* — Yon Couso
(74) *Attorney, Agent, or Firm* — Lowenstein Sandler LLP

(57) ABSTRACT

Methods, systems and computer program products for automatic color correction of image and video content are provided. A computer-implemented method may include generating an auto-level linear transform and a histogram equalization transform of a color distribution histogram for an original image among a set of sequential images. The auto-level linear transform and the histogram equalization transform are blended to create a modified image. Pixel color is adjusted in the modified image so that a color difference between a pixel and neighboring pixels in the modified image corresponds to a color difference between respective pixels in the original image.

22 Claims, 5 Drawing Sheets

(51) Int. Cl.
   *G06T 7/20*   (2017.01)
   *G06T 7/40*   (2017.01)

(56) References Cited

U.S. PATENT DOCUMENTS

| | | | |
|---|---|---|---|
| 7,706,606 B1* | 4/2010 | Ruzon | H04N 1/40012 382/162 |
| 8,340,423 B1 | 12/2012 | Zelinka et al. | |
| 2004/0090453 A1* | 5/2004 | Jasinschi | G11B 27/28 715/723 |

OTHER PUBLICATIONS

Wikipedia, "Histogram Equalization," 6 pages, page last modified on Sep. 26, 2012 at 20:24, <http://en.wikipedia.org/wiki/Histogram_equalization>.
Sheet, Debdoot "Brightness Preserving Dynamic Fuzzy Histogram Equalization," 4 pages, Dec. 11, 2011, <http://www.mathworks.com/matlabcentral/fileexchange/34172-brightness-preserving-dynamic-fuzzy-histogram-equalization>, Matlab Central.
Yin, J. et al., "Color Correction Methods with Applications to Digital Projection Environments," Journal of WSCG, vol. 12, No. 1-3, ISSN 1213-6972 WSCG'2004, Feb. 2-6, 2004, Pizen, Czech Republic, 8 pages.
"Bilateral Filtering for Gray and Color Images," <http://homepages.inf.ed.ac.uk/rbf/CVonline/LOCAL_COPIES/MANDUCHI1/Bilateral_Filtering.html> retrieved Oct. 19, 2012, 5 pages.
USPTO Notice of Allowance for U.S. Appl. No. 13/656,550, mailed Apr. 4, 2014, 8 pages.

* cited by examiner

AUTOMATIC COLOR CORRECTION

RELATED APPLICATIONS

This application is a continuation U.S. patent application Ser. No. 13/656,550, filed on Oct. 19, 2012, the entire contents of which are hereby incorporated by referenced herein.

TECHNICAL FIELD

The field generally relates to visual media and, more particularly, to enhancing the presentation of video images.

BACKGROUND

Many content-sharing websites allow users to post images and videos for public and private display. Recent technological advancements also have made it increasingly convenient for users to capture and share their own visual content. For example, smartphones having one or more high-quality digital cameras, abundant storage space, and mobile broadband allow users to record and share their own videos from virtually anywhere.

However, user generated videos may appear dark for a variety of reasons. For example, poor background lighting, video format conversion, device settings and device capabilities can result in a loss of visual detail and suboptimal display. Manual correction of poor lighting conditions and color detail is time-consuming and inconvenient. Further, single-image color correction methods do not maintain consistency across a set of video frames.

SUMMARY

Embodiments generally relate to the enhancement of visual content. In one embodiment, a computing device generates an auto-level linear transform of a color distribution histogram for an original image among a set of sequential images. The computing device also generates a histogram equalization transform of the color distribution histogram. The auto-level linear transform and the histogram equalization transform are blended to create a modified image. The computing device then transfers detail of the original image to the modified image by adjusting pixel color in the modified image so that a color difference between a pixel and neighboring pixels in the modified image corresponds to a color difference between respective pixels in the original image.

In another embodiment, a system including a memory and a processing device coupled with the memory is configured to generate an auto-level linear transform of a color distribution histogram for an original image among a set of sequential images. The system is also configured to generate a histogram equalization transform of the color distribution histogram. The system blends the auto-level linear transform with the histogram equalization transform to create a modified image. The system then transfers detail of the original image to the modified image by adjusting pixel color in the modified image so that a color difference between a pixel and neighboring pixels in the modified image corresponds to a color difference between respective pixels in the original image.

In a further embodiment, a non-transitory computer-readable storage medium has instructions recorded thereon that when executed by a processor, cause the processor to perform operations. The instructions include computer-readable program code configured to cause the processor to generate an auto-level linear transform of a color distribution histogram for an original image among a set of sequential images and to generate a histogram equalization transform of the color distribution histogram. The instructions also include computer-readable program code to blend the auto-level linear transform with the histogram equalization transform to create a modified image. Additionally, the instructions include computer-readable program code to transfer detail of the original image to the modified image by adjusting pixel color in the modified image so that a color difference between a pixel and neighboring pixels in the modified image corresponds to a color difference between respective pixels in the original image.

Further embodiments, features, and advantages of the disclosure, as well as the structure and operation of the various embodiments of the disclosure are described in detail below with reference to accompanying drawings.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. The drawing in which an element first appears is generally indicated by the left-most digit in the corresponding reference number.

DETAILED DESCRIPTION

Millions of people share and view user-generated videos on the Internet each day. However, videos with poor background lighting and other color deficiencies can be difficult to view. Manual correction of background lighting and color detail is both time consuming and tedious. Further, single-image color correction methods are not suitable for video content. For example, such methods amplify color distribution gaps, result in unnecessary visual deterioration (e.g., saturation effects), and introduce significant variation across video image frames.

Systems and methods for automatic color adjustment of visual content, such as videos and images, are described. Embodiments of the present disclosure combine advantages of multiple color correction methods while addressing associated side effects that would otherwise disrupt visual consistency of video content. For example, a user may upload a user-generated video to a video sharing website. The video sharing website may analyze the video and determine that background lighting or other color adjustments should be made to enhance video quality. The video sharing website may then allow the user to view a sample of corrected video content and initiate enhancement of the entire video.

The video sharing website may enhance the video by applying a series of color correction steps on one, several or every image frame associated with the video content. The video sharing website may include a color adjustment system that generates a color distribution histogram for an image frame associated with the video. The color adjustment system may generate both an auto-level linear transform and a histogram equalization transform from the color distribution histogram. The color adjustment system may then blend the auto-level linear transform with the histogram equalization transform to generate a modified image frame. The color adjustment system may then transfer detail of the original image frame to the modified image frame by adjusting pixel color in the modified image frame. For example, pixel color can be adjusted so that a color difference between a pixel and neighboring pixels in the modified image frame corresponds to a color difference between respective pixels in the original image frame. The adjusting may continue throughout the modified image frame and also may be repeated multiple times.

The color adjustment system may perform the color correction steps for one or more other image frames associated with the video content and may then assemble a collection of modified image frames into an enhanced, color corrected version of the video.

Figure 1:
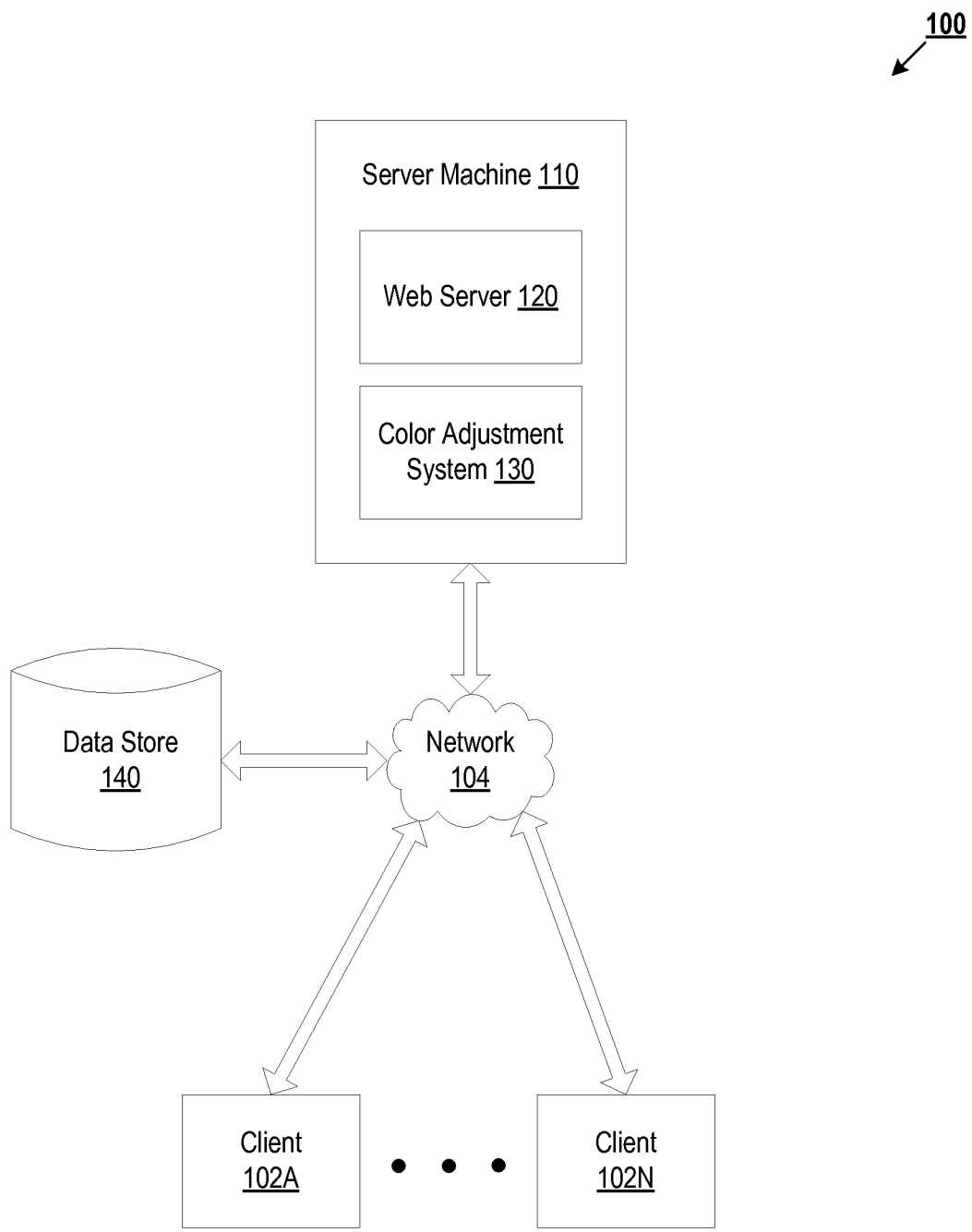
FIG. 1 illustrates an exemplary system architecture, in accordance with various embodiments of the present disclosure.

FIG. 1 illustrates exemplary system architecture 100 in which embodiments can be implemented. The system architecture 100 includes a server machine 110, a data store 140 and client machines 102A-102N connected to a network 104. Network 104 may be a public network (e.g., the Internet), a private network (e.g., a local area network (LAN) or wide area network (WAN)), or a combination thereof.

Data store 140 is persistent storage that is capable of storing various types of data, such as video and image content. In some embodiments data store 140 might be a network-attached file server, while in other embodiments data store 140 might be some other type of persistent storage such as an object-oriented database, a relational database, and so forth. Data store 140 may include user generated content (video and/or image content) that is uploaded by client machines 102A-102N. The data may additionally or alternatively include content provided by one or more other parties. Image and video content may be added to the data store 140 as discrete files (e.g., motion picture experts group (MPEG) files, windows media video (WMV) files, joint photographic experts group (JPEG) files, graphics interchange format (GIF) files, portable network graphics (PNG) files, etc.) or as components of a single compressed file (e.g., a zip file).

The client machines 102A-102N may be personal computers (PC), laptops, mobile phones, tablet computers, or any other computing device. The client machines 102A-102N may run an operating system (OS) that manages hardware and software of the client machines 102A-102N. A browser (not shown) may run on the client machines (e.g., on the OS of the client machines). The browser may be a web browser that can access content served by a web server. The browser may display video content and other visual media provided by a web server and may allow editing of videos and other visual media.

Server machine 110 may be a rackmount server, a router computer, a personal computer, a portable digital assistant, a mobile phone, a laptop computer, a tablet computer, a camera, a video camera, a netbook, a desktop computer, a media center, or any combination of the above. Server machine 110 may include a web server 120 and a color adjustment system 130. In alternative embodiments, the web server 120 and color adjustment system 130 may run on one or more different machines.

Web server 120 may serve video content from data store 140 to clients 102A-102N. Clients 102A-102N may locate, access and view video content from web server 120 using a web browser. Web server 120 also may receive video content from clients 102A-102N that is saved in data store 140 for purposes that may include preservation and distribution.

Web server 120 may receive queries for video content and perform searches for video content using data store 140 to locate video data satisfying the search queries. Web server 120 may then send to a client 102A-102N video data results matching the search query. In one embodiment, web server 120 provides an application configured to allow clients 102A-102N to upload, preview, edit, display and publish video content. Such functionality may be provided, for example, as one or more different web applications, stand-alone applications, systems, plugins, web browser extensions, and application programming interfaces (APIs).

A video is a set of sequential image frames representing a scene in motion. For example, a series of sequential images may be captured continuously or later reconstructed to produce animation. Video content may be presented in various formats including, but not limited to, analog, digital, two-dimensional and three-dimensional video. Further, video content may include movies, video clips or any set of animated images to be displayed in sequence.

Color adjustment system 130 may analyze video content to determine whether the video content should be adjusted to correct and enhance display. For example, color adjustment system 130 may determine whether image frames associated with a video uploaded by a client 102A-102N are dark, inconsistent, or lack appropriate color variation. Color adjustment system 130 also may perform color correction on video content automatically and/or based on a user request.

In an embodiment, web server 120 provides a web application to clients 102A-102N. The web application may include a graphical user interface configured to allow users to upload, display and manage video content. The web application also may include or utilize a color adjustment system 130. In one embodiment, the color adjustment system 130 may analyze video content during an upload process automatically based on one or more of a system setting, user preference, user request, or default. Video content analysis also may be performed by color adjustment system 130, for example, based on a user request received after the video content has been uploaded to data store 140. A user may initiate a request, for example, using one or more commands (e.g., voice, text, motion) or by performing one or more actions/interactions with the graphical user interface (e.g., button click, keyboard shortcut).

In one embodiment, color adjustment system 130 determines that the video content may benefit from color enhancement and provides a corresponding indication to a user (e.g., content owner, content administrator). The web application may notify the user about the availability of enhancement using the graphical user interface. For example, the web application may display a message or alert, update a label, redirect or refresh the interface, and/or provide one or more additional controls (e.g., preview enhancement button, perform enhancement button).

In an embodiment, the graphical user interface is configured to allow a user to initiate video content enhancement, preview a sample or full version of enhanced video content, save enhanced video content, and replace existing video content with enhanced video content. The graphical user interface also may be further configured to allow a user to preview enhanced video content (e.g., sample clip, full-version) with corresponding original video content. For example, enhanced video content may be played simultaneously and alongside original video content to allow side-by-side comparison. In one embodiment, a full or sample version of enhanced video content is automatically generated and available for preview upon user request.

Figure 2:
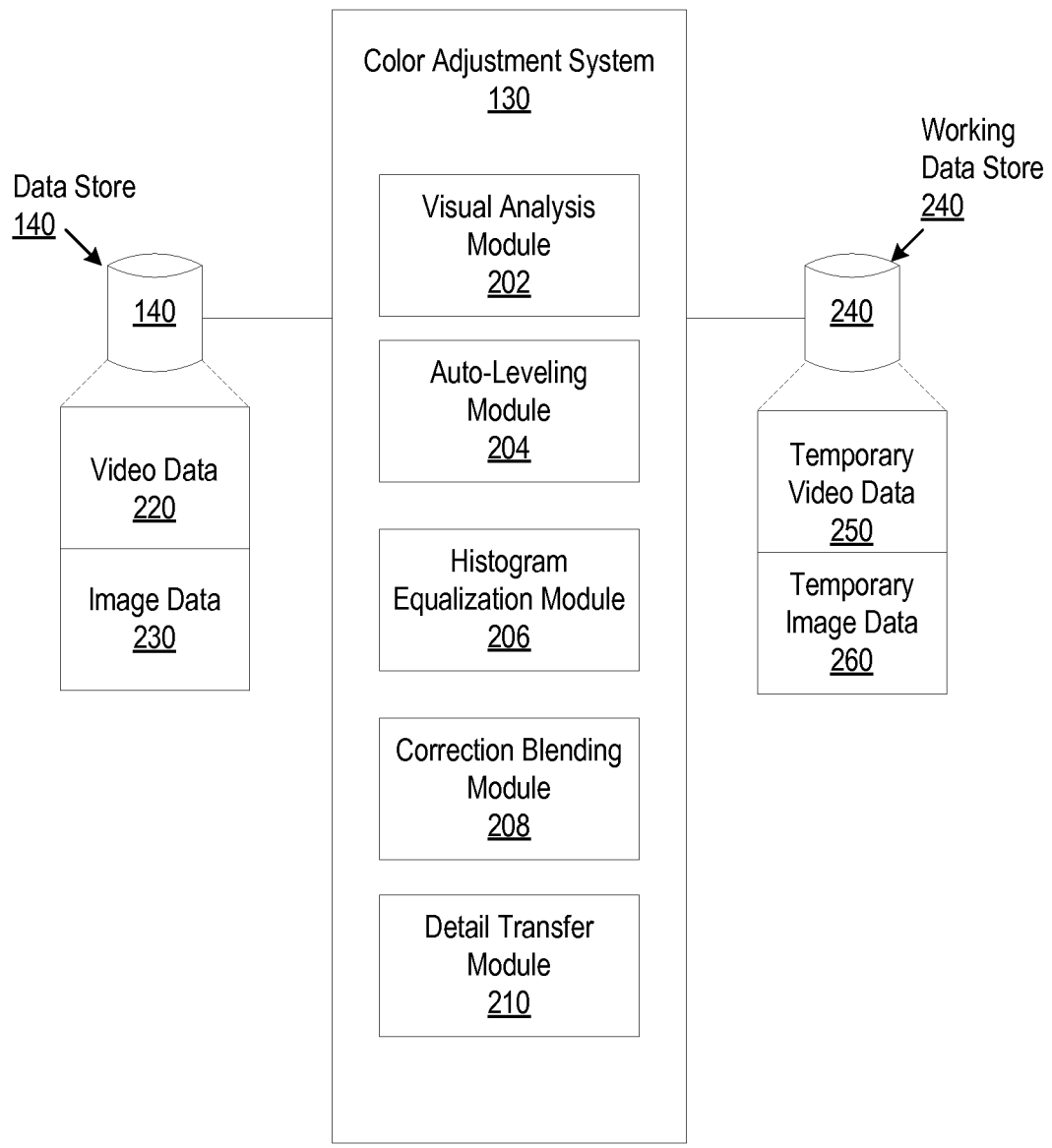
FIG. 2 is a block diagram of a color adjustment system, in accordance with an embodiment.

FIG. 2 is a block diagram of a color adjustment system 130, in accordance with one embodiment of the present disclosure. The color adjustment system 130 includes a visual analysis module 202, an auto-leveling module 204, a histogram equalization module 206, a correction blending module 208, and a detail transfer module 210. In other embodiments, functionality associated with one or more of visual analysis module 202, auto-leveling module 204, histogram equalization module 206, correction blending module 208, and detail transfer module 210 may be combined, divided and organized in various arrangements.

In an embodiment, color adjustment system 130 is coupled to data store 140 and working data store 240. Data store 140 includes video data 220 and image data 230. Working data store 240 includes temporary video data 250 and temporary image data 260.

Video data 220 generally refer to any type of moving image, which includes, but is not limited to movie films, videos, digital videos and other forms of animated drawings or display. For example, video data 220 may include digital videos having a sequence of static image frames that may be stored as image data 230. Thus, each image frame may represent a snapshot of a scene that has been captured according to a time interval.

Video data 220 may include computer animations, including two-dimensional and three-dimensional graphics. Video data 220 also may include any sequence of images, including graphical drawings that create an illusion of movement.

Image data 230 generally refers to any projection of real space through a lens onto a camera sensor. Image data 230 includes, but is not limited to, any type of two-dimensional image, three-dimensional image, video content and/or drawing.

In an embodiment, color adjustment system 130 utilizes working data store 240 as temporary storage space to perform color adjustment of video data 220 and image data 230. Working data store 240 may include, for example, any type or combination of volatile and non-volatile storage (e.g., disk, memory).

In one embodiment, working data store 240 contains temporary video data 250 and temporary image data 260. For example, temporary video data 250 may include one or more copies of video data 220, such as original and modified versions. Further, temporary image data 260 may include one or more copies of image data 230, such as original and modified video image frames.

Working data store 240 also may include temporary data and results produced by color adjustment system 130. For example, working data store 240 may include generated color distribution histogram data, auto-level transform data, histogram equalization transform data, and enhanced/color corrected visual content. Further, color adjustment system 130 may use working data store 240, for example, to perform calculations, to persist intermediate processing results, and to provide color adjusted content to users for review and consideration.

In an embodiment, visual analysis module 202 analyzes video data 220 and/or image data 230 to determine whether the visual content may benefit from color enhancement. For example, visual analysis module 202 may generate or receive a color distribution histogram indicating color intensity of a video image frame. Visual analysis module 202 may then determine that the visual content could benefit from color enhancement by detecting, based on analyzing color distribution histogram data, uneven color distribution, gaps in color distribution, and unused/underutilized areas of a color space. For example, a color distribution confined to the $20^{th}$ and $80^{th}$ percentiles of a color space does not utilize the full spectrum of available colors and thus could potentially benefit from color enhancement.

A color distribution histogram represents how color is distributed throughout an image. For example, a color distribution histogram generally includes a fixed set of color ranges within a defined color space. Each color range has a numeric value indicating a count of pixels having a color value that falls within the specific range.

A color space defines a range of total possible colors. For example, pixel color values can be represented numerically within the boundaries of a color space. (e.g., 0-255 for a color space where 0=black, 255=white). Pixel color value also may be represented as a sum or average of each color value defined by an additive color space (e.g., RGB). In an embodiment, visual analysis module 202 may generate and analyze color distribution histograms associated with different color spaces, which may include, but are not limited to the RGB, sRBG, RGBA, YUV, YPbPr, YCbCr, HSV, and HSL color spaces.

In one embodiment, visual analysis module 202 may generate a color distribution histogram based on a full image. In another embodiment, a color distribution histogram may be generated based on only a portion of an image. For example, a color distribution histogram may be based on a window of a predetermined size near or around the center point of an image. Such sampling may be used, for example, to avoid image frame borders, subtitles, headlines, visual disturbances, and other phenomena that would interfere with color adjustment processing.

In an embodiment, a color distribution histogram may be based on a restricted color range within a color space. For example, while a color space defines a full range of possible ways to express color, a restricted color range refers to a portion or limited range of a color space. In one embodiment, a restricted color space may be defined, for example, based on a specific color value associated with and measured by a color space (e.g., specifically a red channel, green channel, or blue channel for an RGB-type color space). In another embodiment, a restricted color space may be defined as a specific range of values within a color space.

Visual analysis module 202 may estimate, modify and/or produce a color distribution histogram based on color distribution values associated with prior image frames. In one embodiment, a linear quadratic estimation is used to estimate color distribution based on one or more previously occurring image frames. For example, color distribution for an image frame may be estimated by computing a weighted average of color distribution values from one or more previous image frames. The color distribution values of prior image frames may be weighted based on their proximity to the estimation point (e.g., using exponential weighting). The number of prior image frames that are used to produce estimated color distribution values may be determined, for example, based on one or more of a user preference, system setting, and default value.

In one embodiment, visual analysis module 202 uses Kalman filtering to determine an estimated color distribution for an image frame based on prior image frames. Visual analysis module 202 may compare the estimated color distribution values to measured values in an associated color distribution histogram. Visual analysis module 202 may adjust actual values in the color distribution histogram based on the estimated values. For example, visual analysis module may perform adjustment when a difference between an estimated value and an actual value exceeds a threshold defined by a user preference or system setting. Further, adjustment may be performed, for example, by averaging an estimated value and an actual value, accepting the estimated value, accepting the actual value, or combining a weighted estimate with a weighted value.

Auto-leveling module 204 generates an auto-level linear transform of a color distribution histogram by stretching color distribution across a broader range color space. Auto-leveling tends to increase image contrast by utilizing a more dynamic color range. For example, dark pixels (e.g., grey, brown) are typically stretched closer to black, while light pixels (e.g., light colors) are typically stretched closer to white.

In one embodiment auto-leveling module 204 determines a total pixel count for an image by summing color distribution histogram values. Auto-leveling module 204 may then compute a number of pixels from each end of the color distribution to determine edges for the auto-level linear transform. In an embodiment, auto-leveling module 204 determines a number of pixels to use for edges based on some percentage of the total number of pixels. The percentage may be provided, for example, according to a user preference, system setting or default value.

For example, auto-leveling module 204 may find color distribution histogram ranges corresponding to the top 5% and bottom 5% of image pixels. Thus, for an image containing 1000 pixels, each pixel associated with color ranges having the lightest 50 pixels would be stretched/remapped to white, and color ranges containing the darkest 50 pixels would be stretched/remapped to black.

In an embodiment, auto-leveling module 204 continues generating the auto-level transform by stretching/remapping other pixels in the color distribution histogram based on a linear transformation that considers pixel color and the range of remaining pixels. Auto-leveling module 204 may store generated auto-level linear transforms in working data store 240 for subsequent processing.

Histogram equalization module 206 generates a histogram equalization transform of a color distribution histogram. In an embodiment, histogram equalization module 206 creates a histogram equalization transform by computing a cumulative distribution corresponding to each color range in a color distribution histogram. For example, a histogram equalization transform will have a value for each color distribution histogram range, representing the sum of all color distribution histogram values up to and including the corresponding range.

In one embodiment, histogram equalization module 206 adjusts a generated histogram equalization transform by smoothing the distribution of values. For example, histogram equalization module 206 may perform smoothing by averaging each value in a histogram equalization transform with one or more neighboring values. Smoothing may be applied in one or more iterations.

In an embodiment, histogram equalization module 206 may accept smoothing parameters. For example, the number of nearby values to use when smoothing and/or the number of iterations of smoothing to perform may be predefined (e.g., using empirical results). Further, histogram equalization module 206 may store a resulting histogram equalization transform in working data store 240 for subsequent processing.

Correction blending module 208 blends an auto-level linear transform result with a histogram equalization transform result to create a modified image. In an embodiment, each pixel of an original image has an original value (OV). Each pixel also has values associated with the auto-level linear transform A(OV) and the histogram equalization transform E(OV). A blending coefficient (t) (e.g., an empirical value based on previous results) may be used to provide weighting or preference with respect to the auto-leveling transform and the histogram equalization transform. For example, correction blending module 208 may determine new pixel color value by applying a blending transformation, such as:

New Pixel Value=$tA1(OV)+(1-t)E(OV)$.

In an embodiment, correction blending module 208 determines new pixel color values for a modified image by applying a blending transformation to each pixel in an original image. Correction blending module 208 then creates a modified image using the new pixel color values. In one embodiment, new pixel color values are determined for each color channel in an additive color space. The color channels (e.g., red, green, and blue for the RGB color space) are joined to produce a new pixel color according to the additive color space. Further, correction blending module 208 may save modified images in working data store 240 for subsequent processing.

Detail transfer module 210 incorporates visual detail from an original image into a modified image by adjusting pixel color in the modified image to reflect a color difference between respective pixels in the original image. Such restoration is beneficial to preserve visual detail that may have faded or disappeared during color correction. Further, image detail transfer provides consistency across a series of video image frames that have been color corrected.

In an embodiment, detail transfer module 210 determines a color difference between a pixel and a neighbor of the pixel in the modified image. For example, a color difference may be computed as a ratio or other numeric color difference between two pixels (e.g., adjacent pixels, nearby pixels, pixels within a defined radius). Detail transfer module 210 also computes a color difference between corresponding neighboring pixels in the original image (i.e., the same pixel-neighbor pair). Detail transfer module 210 compares the computed color differences to determine whether to adjust pixel color in the modified image.

For example, a pixel that is three times as dark as a neighbor in an original image should be roughly or exactly three times as dark as the same neighbor in the modified image. When a color difference between pixels in the modified image differs from a color difference between corresponding pixels in the original image, the color value of the modified image pixel can be adjusted to produce a similar or matching color difference.

In one embodiment, an adjusted pixel color value is determined by normalizing color difference based on a sum of the pixels. For example, a normalized color difference may be determined based on the following expression: (Pixel Color Value−Neighbor Color Value)/(Pixel Color Value+Neighbor Color Value). Further, the normalized color difference between pixels in a modified image should be equal to the normalized color difference for corresponding pixels in the original image: Modified Image[(Pixel Color Value−Neighbor Color Value)/(Pixel Color Value+Neighbor Color Value)]=Original Image[(Corresponding Pixel Color Value−Corresponding Neighbor Color Value)/(Corresponding Pixel Color Value+Corresponding Neighbor Color Value)].

In one embodiment, a color difference is determined between a pixel and two or more neighbors. For example, a color difference ratio can be computed between a pixel and an average of color values for two or more neighboring and/or nearby pixels (rather than only a single neighboring pixel). Thus, the average of multiple pixel colors can be used in lieu of a single pixel color value when determining a color difference.

In an embodiment, an adjusted color value for a pixel in the modified image may be computed, for example, based on an expression, such as: Modified Image[Pixel Color Value] =Original Image[Pixel Color Value]*(Modified Image [Neighbor Color Value]/Original Image[Corresponding Neighbor Color Value]).

In one embodiment, adjusted pixel color values are computed for each pixel in the modified image. One or more pixel color values are then adjusted in the modified image so that color difference in the modified image corresponds to a color difference in the original image. For example, pixel color values may be fully adjusted in a single pass or incrementally adjusted over several iterations. In addition, detail transfer module 210 may utilize working data store 240, for example, when performing calculations, to store intermediate results, and to save results of detail transfer for subsequent processing.

Figure 3:
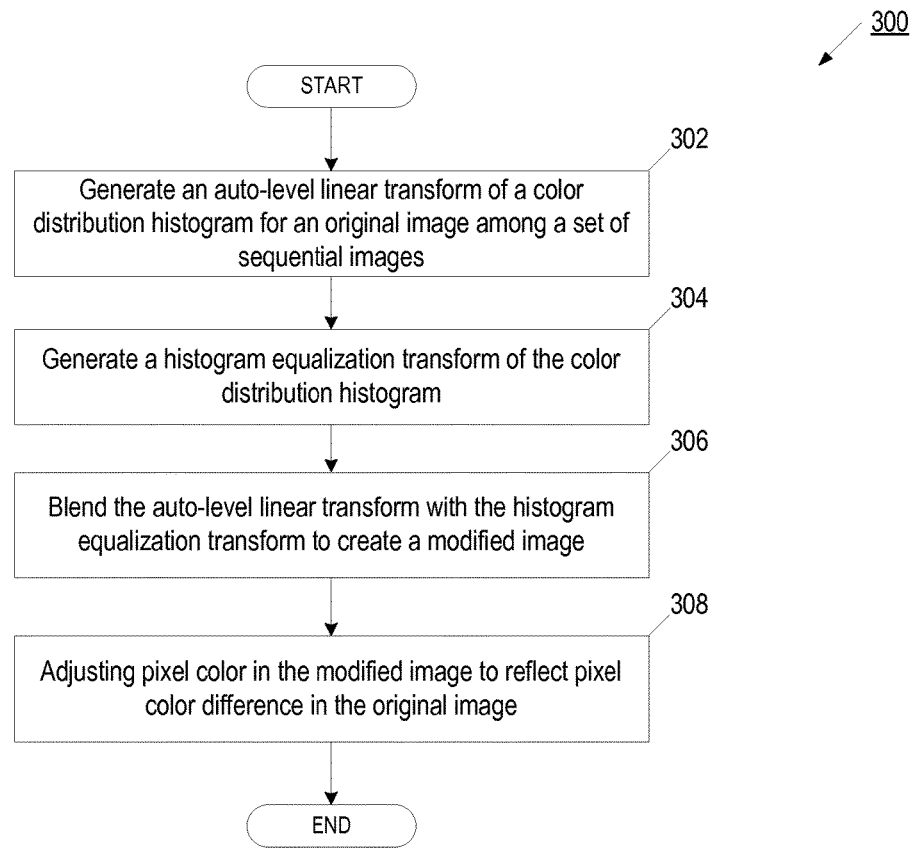
FIG. 3 is a flow diagram illustrating automatic color adjustment, according to an embodiment.

FIG. 3 is a flow diagram illustrating automatic color adjustment, according to an embodiment. The method 300 is performed by processing logic that may comprise hardware (circuitry, dedicated logic, etc.), software (such as is run on a general purpose computer system or a dedicated machine), or a combination of both. In one embodiment, the method 300 is performed by the server machine 110 of FIG. 1. The method 300 may be performed by color adjustment system 130 running on server machine 110 or one or more other computing devices.

Method 300 begins at stage 302, when an auto-level linear transform is generated for an original image associated with a set of sequential images. In an embodiment, auto-leveling module 204 uses color distribution histogram data for an original image frame from video content. Auto-leveling module 204 generates auto-level linear transform data by stretching/remapping the distribution of image colors across a broader range of a color space.

At stage 304, a histogram equalization transform of the color distribution histogram is generated. In one embodiment, histogram equalization module 206 generates histogram equalization transform data by computing a cumulative distribution based on each color range in the color distribution histogram. For example, each equalization transform value indicates the sum of all color distribution histogram values up to and including the corresponding color distribution range. Further, histogram equalization module 206 may, in one or more iterations, perform smoothing of histogram equalization transform values by, for example, averaging each value with one or more neighboring values.

At stage 306 the auto-level linear transform is blended with the histogram equalization transform to create a modified image. In an embodiment, a modified, color corrected version of the original image is created by blending an auto-level linear transform generated by auto-leveling module 204 in stage 302 with a histogram equalization transform generated by histogram equalization module 206 in stage 304.

In one embodiment, correction blending module 208 determines a new pixel color value for each pixel in an original image to create a modified version of the image. For example, a new pixel value for each pixel in the original image may be determined by averaging a pixel's auto-level linear transform value with the pixel's histogram equalization transform value. In another embodiment, a blending coefficient/weighting value is applied to each color correction method when determining a new pixel value.

At stage 308, detail of the original image is transferred to the modified image. For example, detail transfer module 210 may transfer aspects of the original image to the modified image by adjusting pixel color in the modified image so that a color difference between pixels in the modified image reflects a color difference between respective pixels in the original image.

In an embodiment, detail transfer module 210 performs detail transfer as part of a color correction process, which may include one or more other steps. For example, detail transfer module 210 may perform image detail transfer on a series of image frames associated with video content to produce a color corrected/enhanced version of the video content.

In one embodiment, detail transfer module 210 compares a color difference ratio between at least two pixels in an original image to a corresponding color difference ratio for the same pixels in the modified image. Detail transfer module 210 adjusts one or more of the pixel colors in the modified image so that the color difference ratio of the pixels in the modified image reflects (e.g., matches, more closely approximates) the color difference ratio of corresponding original image pixels.

In an embodiment, color difference is determined based on a pixel's color value as compared to a sum or average of color values for every pixel within a defined radius of the pixel (e.g., patch, vicinity, window, neighborhood). For example, a color difference for each pixel and a weighted sum of each respective pixel's neighbors (e.g., nearby pixels inside of a defined radius/neighborhood) can be determined.

In an embodiment, an adjusted color value for a pixel in the modified image may be computed based on the following expression: Modified Image[Pixel Color Value]=Original Image[Pixel Color Value]*(Modified Image[Weighted Sum of Neighborhood Pixels]/Original Image[Weighted Sum of Corresponding Neighborhood Pixels]).

In one embodiment, bilateral filtering may be applied to the equation by determining a weighted average of color values for nearby pixels based on a Gaussian distribution: Modified Image[(Pixel Color Value)]=Original Image[(Pixel Color Value)]*(SUM([Weighted Intensity Value Computed for Each Neighborhood Pixel])).

In an embodiment, a weighted intensity value for each nearby pixel (e.g., a pixel within a defined radius) can be calculated, for example, based on the following expression: Proximity Weighting*Gradient of Neighborhood Pixel* (Modified Image[Neighbor Color Value]/Original Image [Corresponding Neighbor Color Value]). Weighted values for each pixel within the defined radius can then be summed to produce a weighted intensity value for the entire neighborhood of pixels.

In one embodiment, Proximity Weighting is based on a distance between a pixel and another pixel within a defined radius. For example, Proximity Weighting may be based on a Gaussian kernel where the closest pixels (e.g., adjacent pixels) have the most influence and are weighted most heavily. On the other hand, Proximity Weighting decreases (e.g., linearly, exponentially, progressively) as pixels become more distant.

In an embodiment, Gradient of Neighborhood Pixel is an additional weighting factor that is based on the gradient (i.e., derivative) of a nearby pixel within a defined radius or space. Gradient generally refers to the level of detail associated with a pixel and can be determined, for example, based on a difference in color intensity between pixels.

In one embodiment, gradient is measured as a difference in color between a nearby pixel and a reference pixel. Pixels having the highest level of detail (i.e., gradient) will be weighted most heavily while weighting decreases (e.g., linearly, exponentially, progressively) as pixel detail decreases.

In an embodiment, a radius size and/or the shape of a defined neighborhood of pixels may be based on one or more system and/or user defined parameters (e.g., empirically derived). In one embodiment detail transfer is performed in several iterations using a small radius/neighborhood of pixels. In another embodiment, detail transfer is performed using more pixels (i.e., a larger radius/neighborhood), but in fewer iterations to achieve similar detail transfer results.

Figure 4:
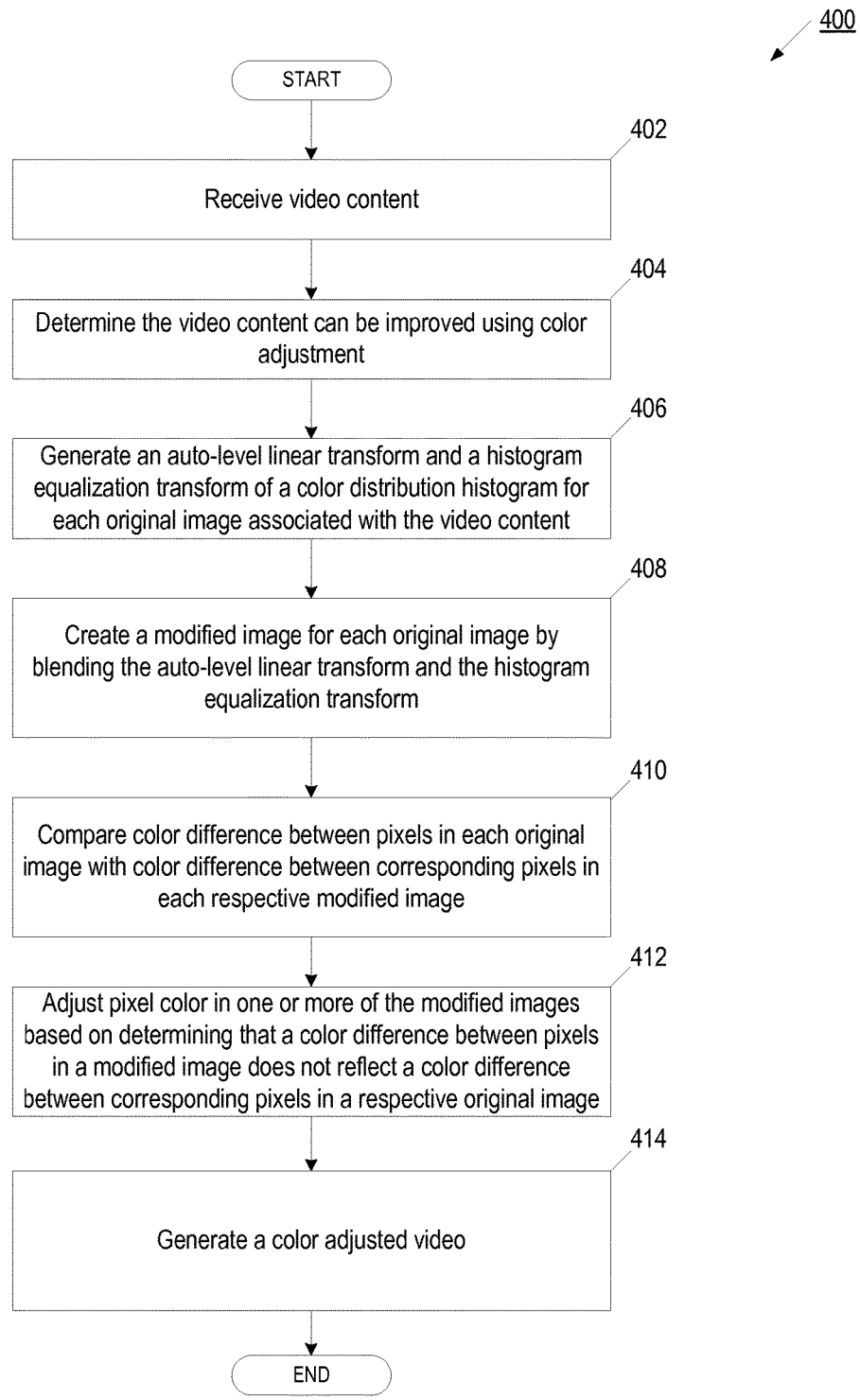
FIG. 4 is a flow diagram illustrating additional aspects of automatic color adjustment, according to an embodiment.

FIG. 4 is a flow diagram illustrating additional aspects of automatic color adjustment, according to an embodiment.

At stage 402, video content is received. According to an embodiment, video content may be received or assembled from one or more sources. For example, video content may arrive as a single video file having a set of sequential image frames. Additionally, a video file may be assembled and/or created using two or more images having a sequential ordering or relationship. Stage 402 may be performed by, for example, visual analysis module 202.

At stage 404, a determination is made that the video content can be improved through color adjustment. In an embodiment, each video image frame is analyzed by visual analysis module 202 to determine whether the image frame utilizes the full range of available color.

For example, a color distribution histogram may be computed for an image. The color distribution histogram can then be analyzed to determine whether the full range of possible colors is adequately utilized. In some embodiments, color distribution histogram data is modified to smooth the value distribution. For example, smoothing may be performed to soften abrupt changes in data by averaging data points with one or more neighboring data points. Smoothing also may be applied in multiple iterations.

In one embodiment, a user is notified that color adjustment is available for video content. A user may initiate color adjustment of video content, for example, using a graphical interface. In another embodiment, video content is automatically adjusted to apply color correction based on the determination. For example, color adjustment of video content may occur automatically based on one or more of a user preference, a system setting, or by default. Stage 404 may be performed by, for example, visual analysis module 202.

At stage 406, an auto-level linear transform and histogram equalization transform are generated for each original image associated with video content. Stage 406 may be performed by, for example, auto-leveling module 204 and histogram equalization module 206.

At stage 408, a modified image is created for each original image by blending the respective auto-level linear transform and respective histogram equalization transform for each original image. Stage 408 may be performed by, for example, correction blending module 208.

At stage 410, a color difference between pixels in each original image is compared with color difference between corresponding pixels in each respective modified image. Stage 410 may be performed by, for example, detail transfer module 210.

At stage 412, pixel color is adjusted in one or more of the modified images based on a determination that a color difference between pixels in a modified image does not reflect a color difference between corresponding pixels in a respective original image. Stage 412 may be performed by, for example, detail transfer module 210.

At stage 414, a color adjusted video is generated based on the modified images that have been adjusted. For example, a collection of modified images that have been adjusted to reflect color differences occurring in respective original images may be assembled into video content. The video content may then be presented to a user for preview and/or full display. Stage 414 may be performed by, for example, detail transfer module 210.

Figure 5:
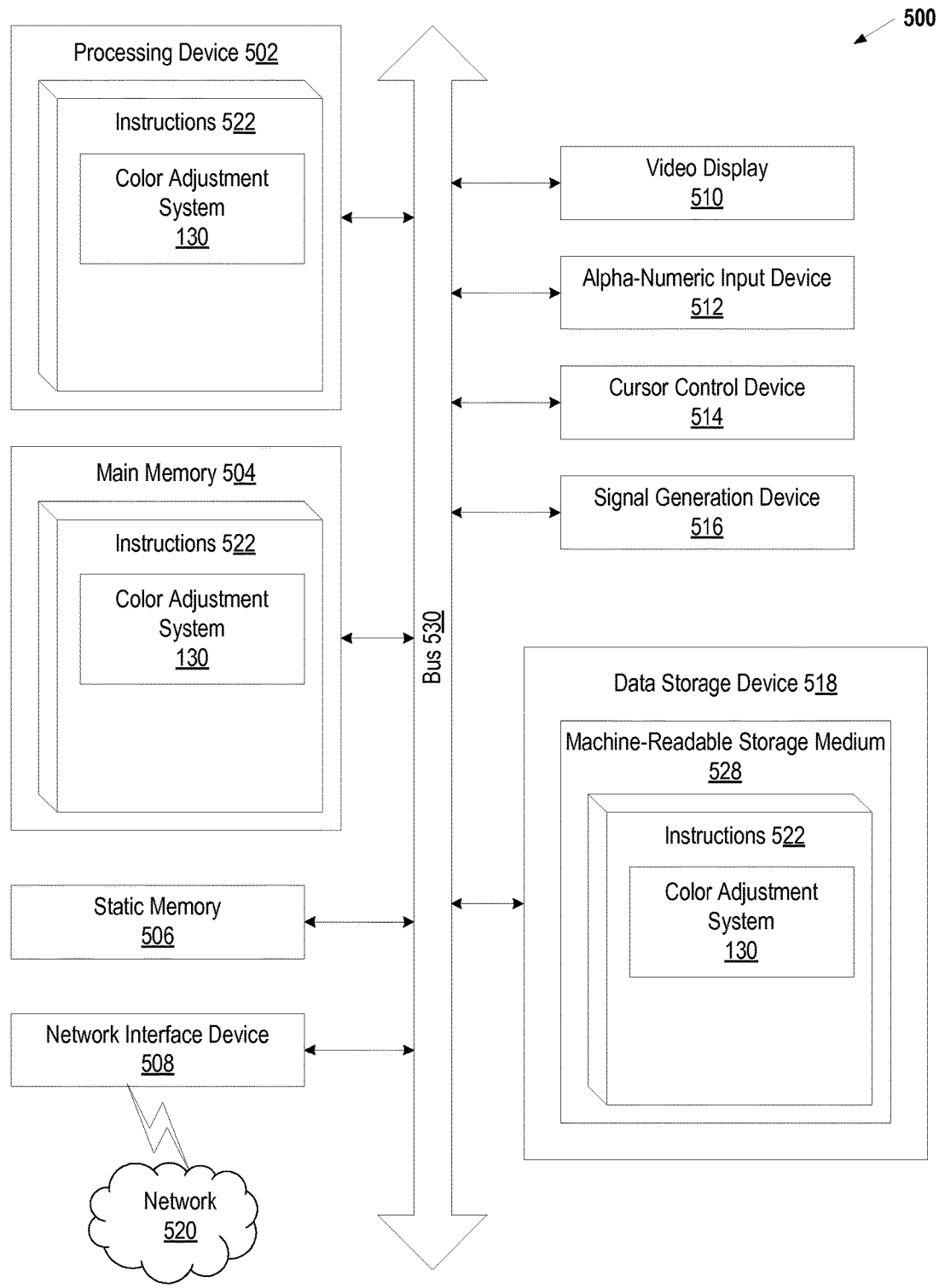
FIG. 5 is a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a large region representation module (e.g., color adjustment system 130 of FIG. 1) and/or a software library containing methods that call a large region representation module. While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present disclosure also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A computer-implemented method comprising:
generating, using a processing device, a first transform of a color distribution histogram for an original image;
generating, using the computer system, a second transform of the color distribution histogram for the original image;
creating, using the computer system, a modified image based on the first transform with the second transform; and
adjusting, using the computer system, pixel color in the modified image to cause a color difference between a pixel and neighboring pixels in the modified image to correspond to a color difference between respective pixels in the original image.

2. The method of claim 1, further comprising:
generating, using the computer system, the color distribution histogram of the original image based on a sample area of a predetermined size around a center point of the original image.

3. The method of claim 1, wherein the creating of the modified image comprises:
determining, using the computer system, a color value for one or more pixels in the modified image by summing a weighted value of a respective pixel in the first transform with a weighted value of a respective pixel in the second transform.

4. The method of claim 1, wherein the second transform is a histogram equalization transform, and the method further comprises:
adjusting, prior to creating the modified image, the histogram equalization transform by smoothing values of the histogram equalization transform.

5. The method of claim 4, wherein the first transform is an auto-level transform, and the method further comprises:
adjusting, prior to generating the auto-level transform and generating the histogram equalization transform, the color distribution histogram based on estimated color distribution values, wherein the values are estimated based on color distribution in one or more prior image frames.

6. The method of claim 1, wherein adjusting the pixel color in the modified image comprises:
comparing, using the computer system, a determined color difference between at least two neighboring pixels in the original image with a determined color difference between corresponding pixels in the modified image.

7. The method of claim 1, wherein the pixel color is adjusted to cause a color difference between the pixel and a weighted average of color values for nearby pixels in the modified image to correspond to a respective color difference between corresponding pixels in the original image.

8. The method of claim 5, wherein creating the modified image comprises blending, using the computer system, the auto-level linear transform with the histogram equalization transform.

9. A system comprising:
a memory; and
a processor, coupled with the memory, to:
generate a first transform of a color distribution histogram for an original image;
generate a second transform of the color distribution histogram for the original image;
create a modified image based on the first transform with the second transform; and
adjust pixel color in the modified image to cause a color difference between a pixel and neighboring pixels in the modified image to correspond to a color difference between respective pixels in the original image.

10. The system of claim 9, wherein the processor is further to:
generate the color distribution histogram of the original image based on a sample area of a predetermined size around a center point of the original image.

11. The system of claim 9, wherein the processor is further to:
determine a color value for one or more pixels in the modified image by summing a weighted value of a respective pixel in the first transform with a weighted value of a respective pixel in the second transform.

12. The system of claim 9, wherein the second transform is a histogram equalization transform, and the processor is further to:
adjust, prior to creating the modified image, the histogram equalization transform by smoothing values of the histogram equalization transform.

13. The system of claim 12, wherein the first transform is an auto-level transform, and the processor is further to:
adjust, prior to generating the auto-level transform and generating the histogram equalization transform, the color distribution histogram based on estimated color distribution values, wherein the values are estimated based on color distribution in one or more prior image frames.

14. The system of claim 9, wherein to adjust the pixel color in the modified image, the processor is further to:
compare a determined color difference between at least two neighboring pixels in the original image with a determined color difference between corresponding pixels in the modified image.

15. The system of claim 9, wherein the pixel color is adjusted to cause a color difference between the pixel and a weighted average of color values for nearby pixels in the modified image to correspond to a color difference between respective pixels in the original image.

16. A non-transitory computer readable storage medium having instructions recorded thereon that, when executed by a processor, cause the processor to perform operations comprising:
generating a first transform of a color distribution histogram for an original image;
generating a second transform of the color distribution histogram for the original image;
creating a modified image based on the first transform with the second transform; and
adjusting pixel color in the modified image to cause a color difference between a pixel and neighboring pixels in the modified image to correspond to a color difference between respective pixels in the original image.

17. The non-transitory computer readable storage medium of claim 16, wherein the operations further comprise:
generating the color distribution histogram of the original image based on a sample area of a predetermined size around a center point of the original image.

18. The non-transitory computer readable storage medium of claim 16, wherein the operations further comprise:
determining a color value for one or more pixels in the modified image by summing a weighted value of a respective pixel in the first transform with a weighted value of a respective pixel in the second transform.

19. The non-transitory computer readable storage medium of claim 16, wherein the second transform is a histogram equalization transform, and the operations further comprise:
adjusting, prior to creating the modified image, the histogram equalization transform by smoothing values of the histogram equalization transform.

20. The non-transitory computer readable storage medium of claim 19, wherein the first transform is an auto-level transform, and the operations further comprise:
adjusting, prior to generating the auto-level transform and generating the histogram equalization transform, the color distribution histogram based on estimated color distribution values, wherein the values are estimated based on color distribution in one or more prior image frames.

21. The non-transitory computer readable storage medium of claim 16, wherein adjusting the pixel color in the modified image comprises:
comparing a determined color difference between at least two neighboring pixels in the original image with a determined color difference between corresponding pixels in the modified image.

22. The non-transitory computer readable storage medium of claim 19, wherein creating the modified image comprises blending the auto-level linear transform with the histogram equalization transform.

* * * * *